Aug. 25, 1942.                C. E. BESTOR                2,293,796
            PORTABLE GARDEN SPRINKLING AND FERTILIZING APPARATUS
                       Filed Jan. 11, 1939           2 Sheets-Sheet 1
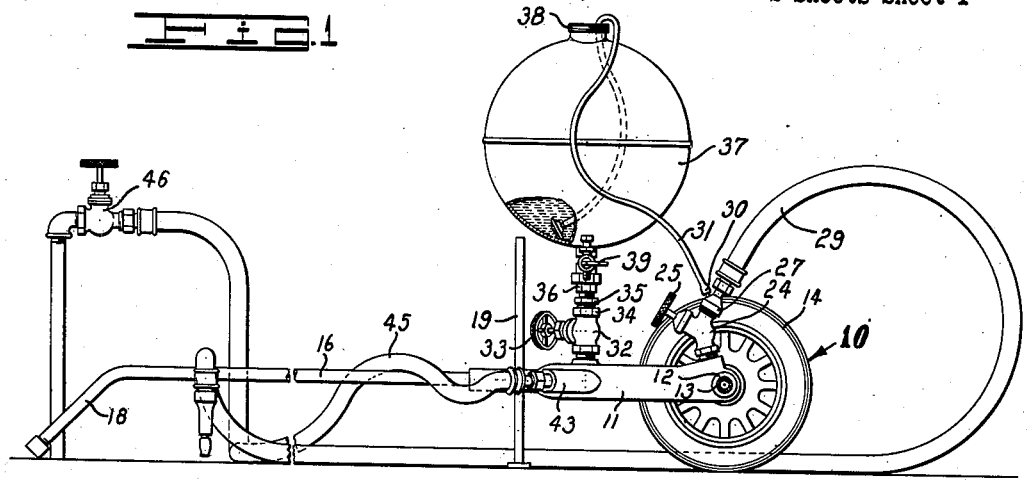
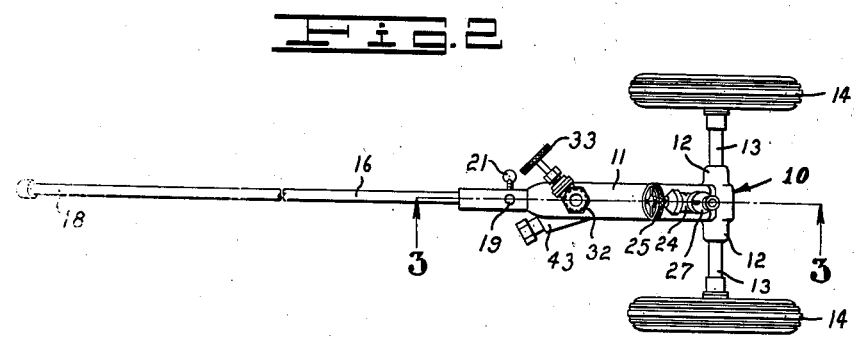
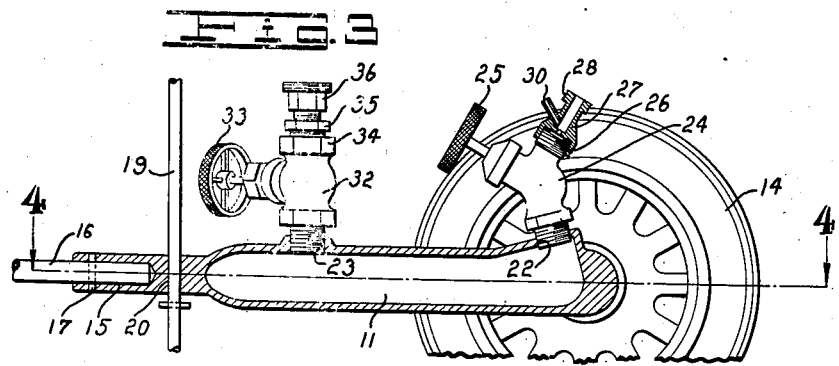
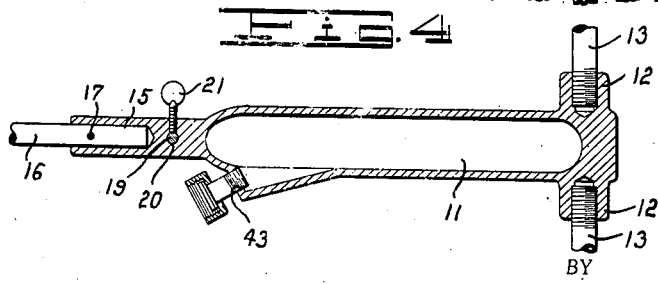
INVENTOR.
C. E. Bestor.
BY
ATTORNEY.

Aug. 25, 1942.  C. E. BESTOR  2,293,796
PORTABLE GARDEN SPRINKLING AND FERTILIZING APPARATUS
Filed Jan. 11, 1939  2 Sheets-Sheet 2
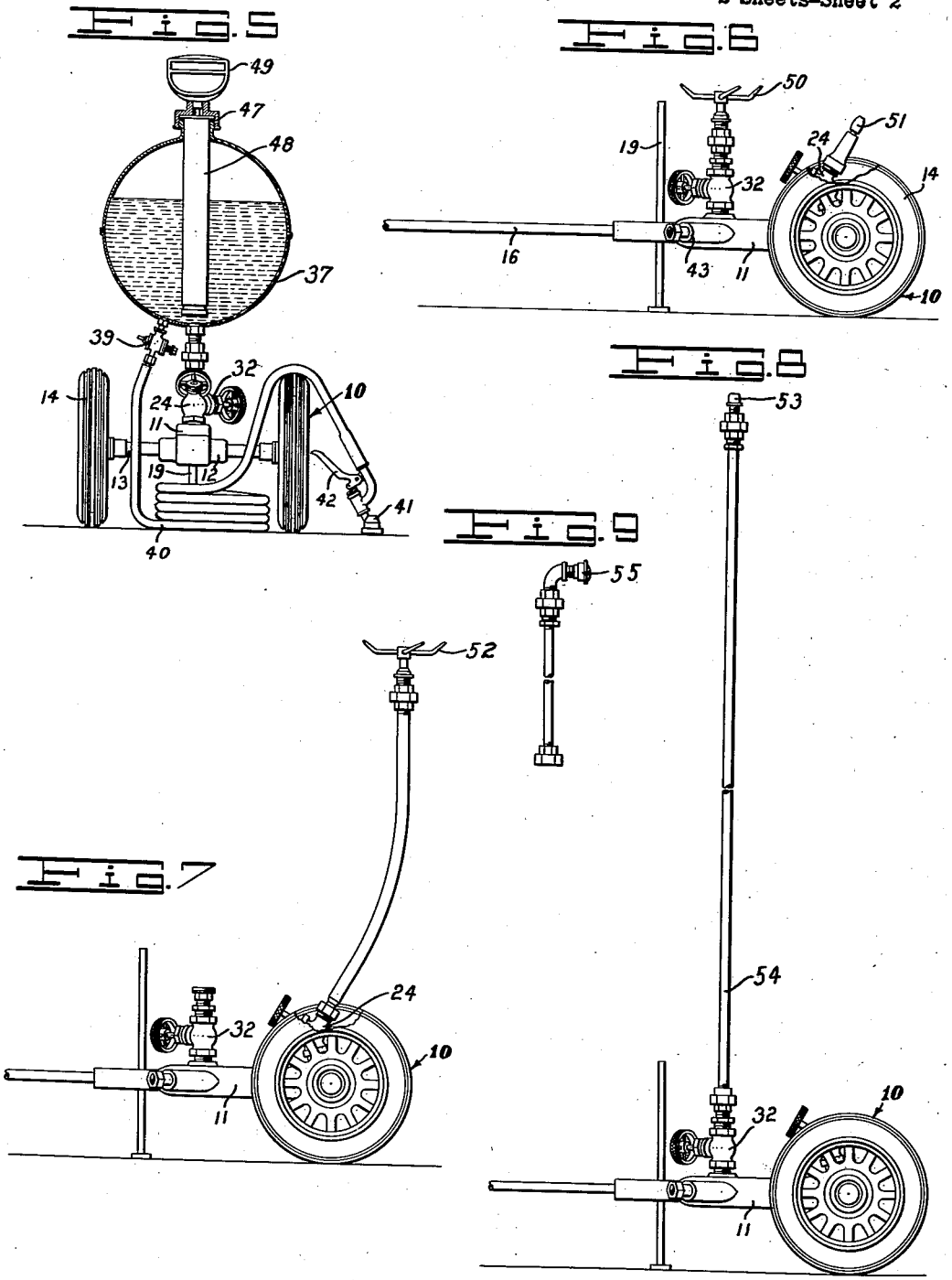
INVENTOR.
C. E. Bestor.
BY
ATTORNEY Patented Aug. 25, 1942

2,293,796

UNITED STATES PATENT OFFICE 2,293,796

PORTABLE GARDEN SPRINKLING AND FERTILIZING APPARATUS

Cecil Earle Bestor, Pasadena, Calif.

Application January 11, 1939, Serial No. 250,254

1 Claim. (Cl. 299—84)

This invention relates to portable garden sprinkling and fertilizing apparatus.

The general object of the invention is to provide an improved portable sprinkling and fertilizing apparatus which includes novel means enabling an efficient sprinkling operation or an efficient distribution of fertilizer to be made.

Another object of the invention is to provide a novel wheeled manifold member for distributing fluids in a garden.

A further object of the invention is to provide a novel insecticide sprayer.

Other objects and advantages of my invention will be apparent from the following description taken in connection with the accompanying drawings, wherein:

Fig. 1 is a side elevation, with parts broken away, showing my invention;

Fig. 2 is a top plan view of the apparatus;

Fig. 3 is a fragmentary section taken on line 3—3 of Fig. 2;

Fig. 4 is a fragmentary section taken on line 4—4 of Fig. 3;

Fig. 5 is an end view of the apparatus with the tank in section;

Fig. 6 is a side elevation showing the sprinkler attached;

Fig. 7 is a side elevation showing the elevated sprinkler attached;

Fig. 8 is a side elevation showing the humidifier attached; and

Fig. 9 is a fragmentary view showing the shower head attachment.

This application is a continuation in part of my copending application, Serial No. 196,209, filed March 16, 1938.

Referring to the drawings by reference characters I have shown my invention as embodied in an apparatus which is indicated generally as at 10 as including a manifold 11 which includes a threaded boss 12 at each side in which axles 13 are threaded. The axles support wheels 14 which may include pneumatic tires if desired.

At the end remote from the axles the manifold includes a bore 15 in which a handle 16 is secured by a pin 17. The handle includes a bent end portion 18 so that the manifold will be held in a horizontal position when the end of the handle engages the ground. In order to tilt the manifold I provide a support 19 which passes through an aperture 20 in the manifold and which may be held in place by a thumb nut 21.

The manifold 11 is elongated and at one end adjacent the axles includes an outlet 22 and adjacent the other end includes an outlet 23.

Mounted on the outlet 22 I show an angle valve 24 which includes a handle 25 and a threaded portion 26 which is engaged by a coupling 27. The coupling 27 includes a threaded discharge portion 28 to which a hose 29 is connected. The coupling further includes a lateral inlet 30 to which a flexible tube 31 is connected.

The outlet 23 is connected to a valve 32 which includes a handle 33 and an outlet 34 which receives a bushing 35. The bushing 35 is engaged by a coupling 36 which is connected to a globular tank 37. The tank 37 includes a threaded opening portion 38 through which the tube 31 extends.

The tank 37 also includes a discharge valve 39 which at one end communicates with the lower portion of the tank and at the other end is attached to a hose 40 which at its end remote from the tank includes a spray nozzle 41 having a control operating handle 42 thereon.

The manifold includes an inlet 43 the axis of which is inclined relative to the axis of the manifold 11 which is connected to a suitable hose 45 shown as connected to a hydrant 46.

In use a suitable quantity of fertilizer is placed in the tank 37 and the valve 32 is opened until a sufficient quantity of water has been run into the tank 37. The valve 32 is then closed and the valve 24 is opened. The fertilizer then runs through the hose 29 and is directed to the proper location.

For spraying purposes the coupling 27 is removed and the valve 24 left closed. As shown in Fig. 5 a closure 47 is then mounted to the threaded portion 38 of the tank 37. The closure 47 includes a pump 48 which may be operated by a handle 49. In normal operation a suitable quantity of spray material is placed in the tank 37 before the closure 47 is secured. The valve 32 is opened and water is run into the tank 37 thus compressing the air which remains in the tank. The valve 32 is then closed and the hose 45 is removed and the apparatus moved to the proper place whereupon the handle 42 is operated with the spray nozzle 41 directed to the desired location.

In Fig. 6 the apparatus is shown with sprinkler 50 mounted on the valve 32 and with a nozzle 51 mounted on the valve 24. Either the sprinkler 50 or the nozzle 51 may be used for sprinkling or for washing shrubbery and with the nozzle 51 removed and with the valve 24 open the apparatus may be used for heavy irrigation. In Fig. 7 a rotary shower sprinkler 52 is connected to the valve 24, while in Fig. 8 a humidifying spray nozzle 53 is connected to the valve 32 by a pipe 54. If desired, the nozzle 53 may be removed and a needle or other spray nozzle 55 (see Fig. 9) may be connected to the upper end of the pipe 54.

Other uses than those mentioned above for my apparatus will suggest themselves to the user and from the foregoing description it will be apparent that I have invented a novel portable garden sprinkling and fertilizing apparatus which can be economically manufactured and which is highly efficient for the intended purpose.

Having thus described my invention I claim:

In a sprinkling device, an integral, one piece, manifold having an upwardly and forwardly inclined portion at the forward end thereof, said manifold having a hollow elongated chamber, said chamber having a pair of upwardly directed outlets and having a laterally directed inlet, one of said outlets being located in said forwardly inclined portion, the axis of said inlet forming an acute angle with the axis of said chamber, a coupling member communicating with said inlet, and the other outlet being disposed adjacent said inlet, a valve communicating with said one outlet, a coupling on said valve, said coupling having a discharge portion and a lateral inlet, a discharge hose communicating with said discharge portion and a suction hose communicating with said lateral inlet, a second valve mounted on said manifold and communicating with said other outlet, a fitting communicating with said second valve and a tank supported on said fitting, said tank being out of communication with said manifold, said tank having an opening therein, said suction hose passing through said opening and having its inlet end disposed in said tank.

CECIL EARLE BESTOR.